United States Patent
Yamamoto (10) Patent No.: US 12,269,474 B2
(45) Date of Patent: Apr. 8, 2025

(54) AUTOMATED DRIVING METHOD, AUTOMATED DRIVING SYSTEM, AND STORAGE MEDIUM

(71) Applicant: TOYOTA JIDOSHA KABUSHIKI KAISHA, Toyota (JP)

(72) Inventor: Daiki Yamamoto, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 285 days.

(21) Appl. No.: 17/832,941

(22) Filed: Jun. 6, 2022

(65) Prior Publication Data
US 2023/0009606 A1    Jan. 12, 2023

(30) Foreign Application Priority Data
Jul. 9, 2021  (JP) .................. 2021-114376

(51) Int. Cl.
| | |
|---|---|
| B60W 30/18 | (2012.01) |
| B60W 30/12 | (2020.01) |
| B60W 50/14 | (2020.01) |
| G05D 1/00 | (2024.01) |
| G08G 1/16 | (2006.01) |

(52) U.S. Cl.
CPC ...... *B60W 30/18163* (2013.01); *B60W 30/12* (2013.01); *B60W 50/14* (2013.01); *G05D 1/0088* (2013.01); *G08G 1/167* (2013.01); *B60W 2520/105* (2013.01)

(58) Field of Classification Search
None
See application file for complete search history.

(56) References Cited

U.S. PATENT DOCUMENTS

| | | | |
|---|---|---|---|
| 2020/0010088 A1* | 1/2020 | Kokaki | B60W 30/188 |
| 2020/0298769 A1* | 9/2020 | Ha | B60R 1/27 |
| 2020/0398849 A1* | 12/2020 | Kanoh | G08G 1/16 |
| 2021/0009103 A1* | 1/2021 | Yashiro | B60W 10/184 |
| 2021/0269040 A1* | 9/2021 | Kurokawa | B62D 15/0265 |
| 2021/0276561 A1* | 9/2021 | Hayakawa | B60W 30/0956 |
| 2021/0309243 A1* | 10/2021 | Park | B60W 30/09 |
| 2022/0024461 A1* | 1/2022 | Takei | G08G 1/0145 |

FOREIGN PATENT DOCUMENTS

| | | |
|---|---|---|
| JP | 4163074 B2 | 10/2008 |
| JP | 4926859 B2 | 5/2012 |
| JP | 2019-218004 A | 12/2019 |

* cited by examiner

*Primary Examiner* — Anne Marie Antonucci
*Assistant Examiner* — Patrick M Brady
(74) *Attorney, Agent, or Firm* — Dinsmore & Shohl LLP (57) ABSTRACT

An indication of an intention of making a lane change to an adjacent lane that is issued from a preceding vehicle that travels in the same lane as an own vehicle is sensed while causing the own vehicle to travel while following the preceding vehicle. When the indication of the intention of making the lane change is sensed, deviation of the preceding vehicle toward the adjacent lane from an occupied region that is occupied by the own vehicle in traveling in the lane is sensed. Then, when deviation of the preceding vehicle from the occupied region is sensed, acceleration suppression for causing the own vehicle to travel while following the preceding vehicle is canceled.

5 Claims, 8 Drawing Sheets

AUTOMATED DRIVING METHOD, AUTOMATED DRIVING SYSTEM, AND STORAGE MEDIUM

CROSS-REFERENCE TO RELATED APPLICATION

This application claims priority to Japanese Patent Application No. 2021-114376 filed on Jul. 9, 2021, incorporated herein by reference in its entirety.

BACKGROUND

1. Technical Field

The present disclosure relates to an automated driving technology including an automated driving method, an automated driving system, and a storage medium.

2. Description of Related Art

In Japanese Patent No. 4163074, there is disclosed a technology for making a determination on deviation of a preceding vehicle at an appropriate timing in follow-up traveling control for causing an own vehicle to travel while following the preceding vehicle. In the technology disclosed in Japanese Patent No. 4163074, when a predetermined holding time is counted after a preceding vehicle captured on a traveling lane of an own vehicle becomes impossible to capture, it is determined that the preceding vehicle has deviated from the traveling lane. In this determination, factors that can make the preceding vehicle impossible to capture are estimated based on a recognition state of an ex-vehicle environment and a degree of recognition of white lines, and the speed of counting the holding time is changed in accordance with the respective factors thus estimated.

In follow-up traveling control, when the vehicle speed of the preceding vehicle is lower than a set vehicle speed of the own vehicle, the own vehicle is accelerated to the set vehicle speed in response to deviation of the preceding vehicle from the traveling lane of the own vehicle. However, with a method of determining that the preceding vehicle has deviated on the condition that the preceding vehicle becomes impossible to capture, it may be impossible to make a determination on deviation until the preceding vehicle finishes moving to an adjacent lane. A passenger may develop a feeling of strangeness unless the own vehicle can be accelerated at an appropriate timing when the preceding vehicle makes a lane change.

As a document indicating the technical level at the time of the filing of the application in the technical field of the present disclosure, Japanese Patent No. 4926859 can be exemplified in addition to Japanese Patent No. 4163074.

SUMMARY

The present disclosure has been made in consideration of the problem as described above. It is an object of the present disclosure to provide an automated driving technology that enables an own vehicle to be accelerated at a timing that does not cause a feeling of strangeness to a passenger in the case where a preceding vehicle makes a lane change when the own vehicle travels while following the preceding vehicle.

The present disclosure provides an automated driving method. The automated driving method of the present disclosure includes the following steps. The first step is a step of sensing an indication of an intention of making a lane change to an adjacent lane that is issued from a preceding vehicle that travels in the same lane as an own vehicle, while causing the own vehicle to travel while following the preceding vehicle. The second step is a step of sensing deviation of the preceding vehicle toward the adjacent lane from an occupied region, when the indication of the intention of making the lane change is sensed. The occupied region is a region that is occupied by the own vehicle in traveling in its own lane. Moreover, the third step is a step of canceling acceleration suppression for causing the own vehicle to travel while following the preceding vehicle, when deviation of the preceding vehicle from the occupied region is sensed.

In the automated driving method of the present disclosure, the blinking of a direction indicator lamp of the preceding vehicle may be sensed as the indication of the intention of making the lane change.

The automated driving method of the present disclosure may further include at least one of the following steps, namely, a fourth step and a fifth step. The fourth step is a step of maintaining acceleration suppression instead of canceling acceleration suppression when a vehicle traveling in the adjacent lane at a higher speed than the own vehicle is sensed behind the preceding vehicle. The fifth step is a step of maintaining acceleration suppression instead of canceling acceleration suppression when a vehicle traveling in the adjacent lane at a lower speed than the preceding vehicle is sensed in front of the preceding vehicle.

The present disclosure provides an automated driving system. The automated driving system of the present disclosure is equipped with at least one memory that stores at least one program, and at least one processor coupled to the at least one memory. The at least one processor is configured to perform the following processes by executing the at least one program. The first process is a process of sensing an indication of an intention of making a lane change to an adjacent lane that is issued from a preceding vehicle that travels in the same lane as an own vehicle, while causing the own vehicle to travel while following the preceding vehicle. The second process is a process of sensing deviation of the preceding vehicle toward the adjacent lane from an occupied region, when the indication of the intention of making the lane change is sensed. Moreover, the third process is a process of canceling acceleration suppression for causing the own vehicle to travel while following the preceding vehicle, when deviation of the preceding vehicle from the occupied region is sensed.

The present disclosure provides a storage medium storing an automated driving program. The storage medium of the present disclosure is configured to store the automated driving program that causes a computer to perform the following processes. The first process is a process of sensing an indication of an intention of making a lane change to an adjacent lane that is issued from a preceding vehicle that travels in the same lane as an own vehicle, while causing the own vehicle to travel while following the preceding vehicle. The second process is a process of sensing deviation of the preceding vehicle toward the adjacent lane from an occupied region, when the indication of the intention of making the lane change is sensed. Moreover, the third process is a process of canceling acceleration suppression for causing the own vehicle to travel while following the preceding vehicle, when deviation of the preceding vehicle from the occupied region is sensed.

According to the technology of the present disclosure, acceleration suppression for causing the own vehicle to travel while following the preceding vehicle is canceled, when the indication of the intention of making the lane change to the adjacent lane from the preceding vehicle is sensed and deviation of the preceding vehicle toward the adjacent lane from the occupied region of the own vehicle is further sensed. In the case where the preceding vehicle makes a lane change when the own vehicle travels while following the preceding vehicle, acceleration suppression is canceled in response to the fulfillment of such conditions. Thus, the own vehicle can be accelerated at a timing that does not cause a feeling of strangeness to a passenger.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The embodiments of the present disclosure will be described hereinafter with reference to the drawings. It should be noted, however, that when numerals such as the number of pieces, numerical quantity, amount, range, and the like of each of elements are mentioned in the following embodiments, the concept according to the present disclosure is not limited to the mentioned numerals unless otherwise specified or unless the numerals should be interpreted in a limiting manner in principle. Besides, the structure and the like that will be described in the following embodiments are not indispensable to the concept according to the present disclosure unless otherwise specified or unless the structure and the like should be interpreted in a limiting manner in principle.

1. Introduction to Automated Driving Method of One of Embodiments

Figure 1:
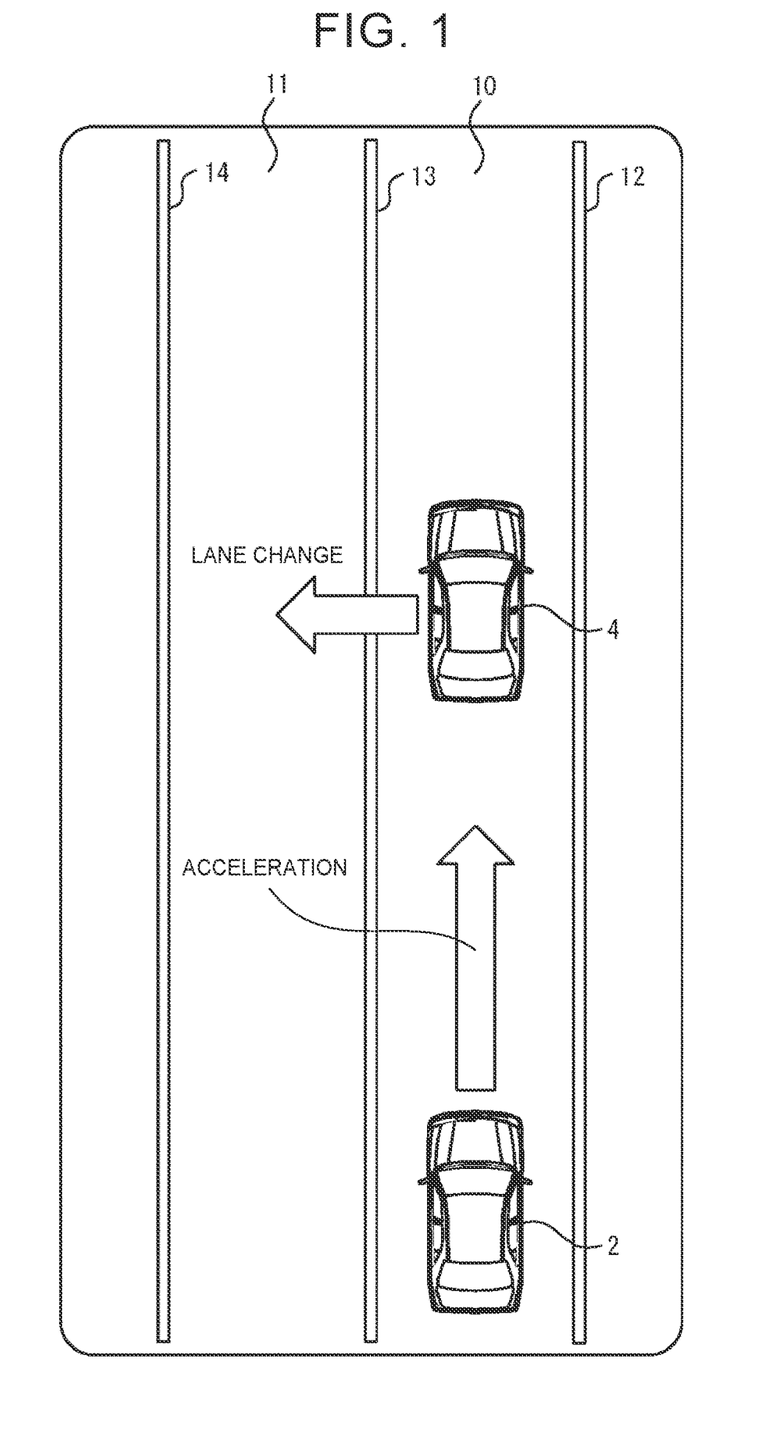
FIG. 1 is a view for an introduction to an automated driving method according to one of the embodiments of the present disclosure.

FIG. 1 shows a road having two lanes on one side. A lane 10 defined by a right marking line 12 and a central marking line 13 in a direction of travel is an overtaking lane, and a lane 11 defined by the central marking line 13 and a left marking line 14 in the direction of travel is a traveling lane.

In the example shown in FIG. 1, an own vehicle 2 travels in the lane 10. There is a preceding vehicle 4 in front of the own vehicle 2 in the lane 10. Incidentally, the own vehicle 2 in the present specification is assumed to be a vehicle to which an automated driving method of one of the embodiments is applicable.

It is assumed herein that there is a scene in which the preceding vehicle 4 makes a lane change in such a manner as to clear the way for the own vehicle 2 that follows the preceding vehicle 4. In the case where the own vehicle 2 is manually driven by a driver, the preceding vehicle 4 clears the way and hence the driver can accelerate the own vehicle 2 to a desired speed. A timing of acceleration in this case is weighed by the driver himself or herself. That is, in the case where the own vehicle 2 is manually driven, the timing when the own vehicle 2 is accelerated in response to the lane change made by the preceding vehicle 4 is optimized by the driver himself or herself.

On the other hand, in the case where the own vehicle 2 is driven in an automated manner through follow-up traveling control, for example, through adaptive cruise control (ACC), the preceding vehicle 4 that makes the lane change is excluded from a follow-up target in follow-up traveling control. As a result of excluding the preceding vehicle 4 from the follow-up target, acceleration suppression for follow-up traveling imposed on the own vehicle 2 is canceled. Due to the cancelation of acceleration suppression, the own vehicle 2 can be accelerated to a set vehicle speed in automated driving. As is apparent from this behavior of the vehicle 2 in automated driving, the timing when the own vehicle 2 is accelerated in response to the lane change made by the preceding vehicle 4 depends on the logic of excluding the preceding vehicle 4 making the lane change from the follow-up target.

However, if the timing when the own vehicle 2 is accelerated through automated driving does not match the senses of a passenger, the passenger may develop a feeling of strangeness. For example, if the timing when the own vehicle 2 is accelerated in response to the lane change made by the preceding vehicle 4 is too late, the passenger may be frustrated. On the contrary, if the timing when the own vehicle 2 is accelerated in response to the lane change made by the preceding vehicle 4 is too early, the passenger may feel tense.

Thus, the automated driving method according to the present embodiment adopts a logic for accelerating the own vehicle 2 at a timing that does not cause a feeling of strangeness to the passenger in the case where the preceding vehicle 4 makes a lane change when the own vehicle 2 travels while following the preceding vehicle 4. The automated driving method according to the present embodiment will be described hereinafter.

2. Description of Automated Driving Method of Present Embodiment

In the automated driving method of the present embodiment, four matters, namely, the first to fourth matters are confirmed sequentially. Then, when all the matters are confirmed, the preceding vehicle 4 is excluded from the follow-up target, and acceleration suppression for follow-up traveling imposed on the own vehicle 2 is canceled.

Figure 2:
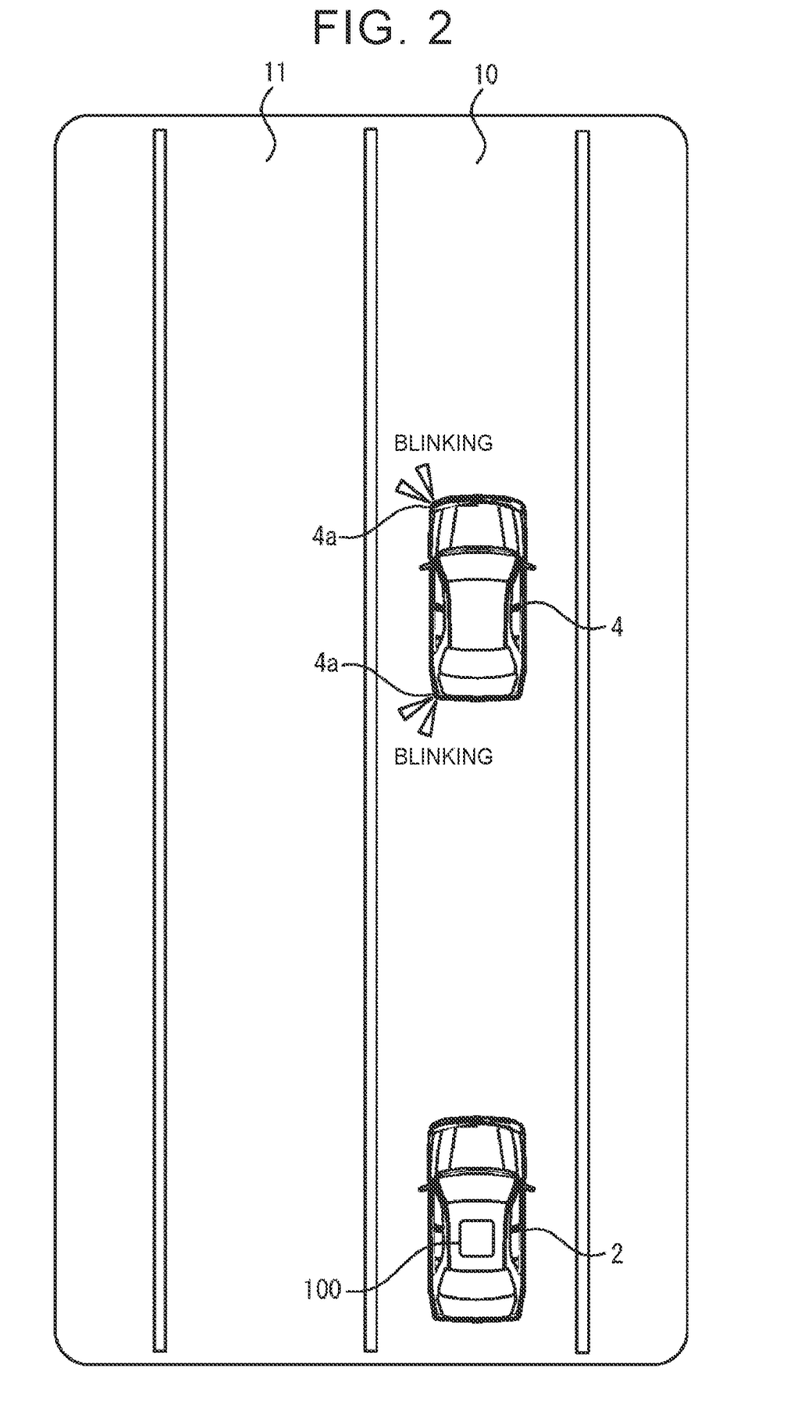
FIG. 2 is a view illustrating a first matter confirmed in the automated driving method according to the embodiment of the present disclosure.

The first matter confirmed in the automated driving method according to the present embodiment will be described using FIG. 2. FIG. 2 depicts that the preceding vehicle 4 travels in front of the own vehicle 2 in the lane 10 in which the own vehicle 2 travels, and that the own vehicle 2 travels while following the preceding vehicle 4. Follow-up traveling control for causing the own vehicle 2 to travel while following the preceding vehicle 4 is performed by an automated driving system 100 mounted in the own vehicle 2.

The automated driving system 100 senses an indication of an intention of making a lane change to an adjacent lane that is issued from the preceding vehicle 4. In the present embodiment, the automated driving system 100 senses the blinking of a direction indicator lamp of the preceding vehicle 4 as the indication of the intention of making the lane change. That is, the first matter confirmed in the automated driving method according to the present embodiment is the blinking of the direction indicator lamp as the indication of the intention of making the lane change by the preceding vehicle 4. In the example shown in FIG. 2, since left direction indicator lamps 4a blink, it is possible to determine that the preceding vehicle 4 intends to make a lane change to the left lane 11.

Figure 3:
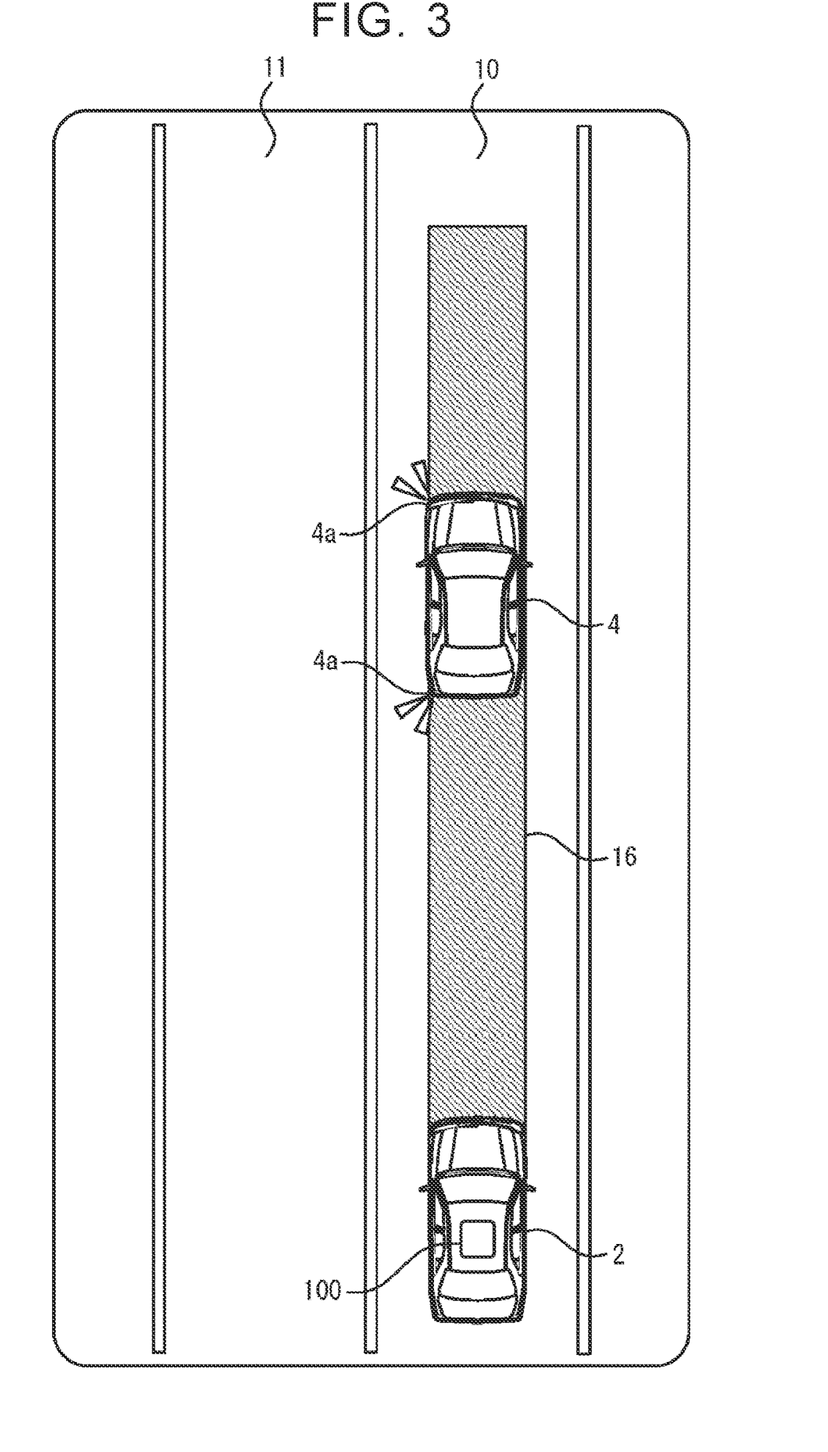
FIG. 3 is a view illustrating a second matter confirmed in the automated driving method according to the embodiment of the present disclosure.
Figure 4:
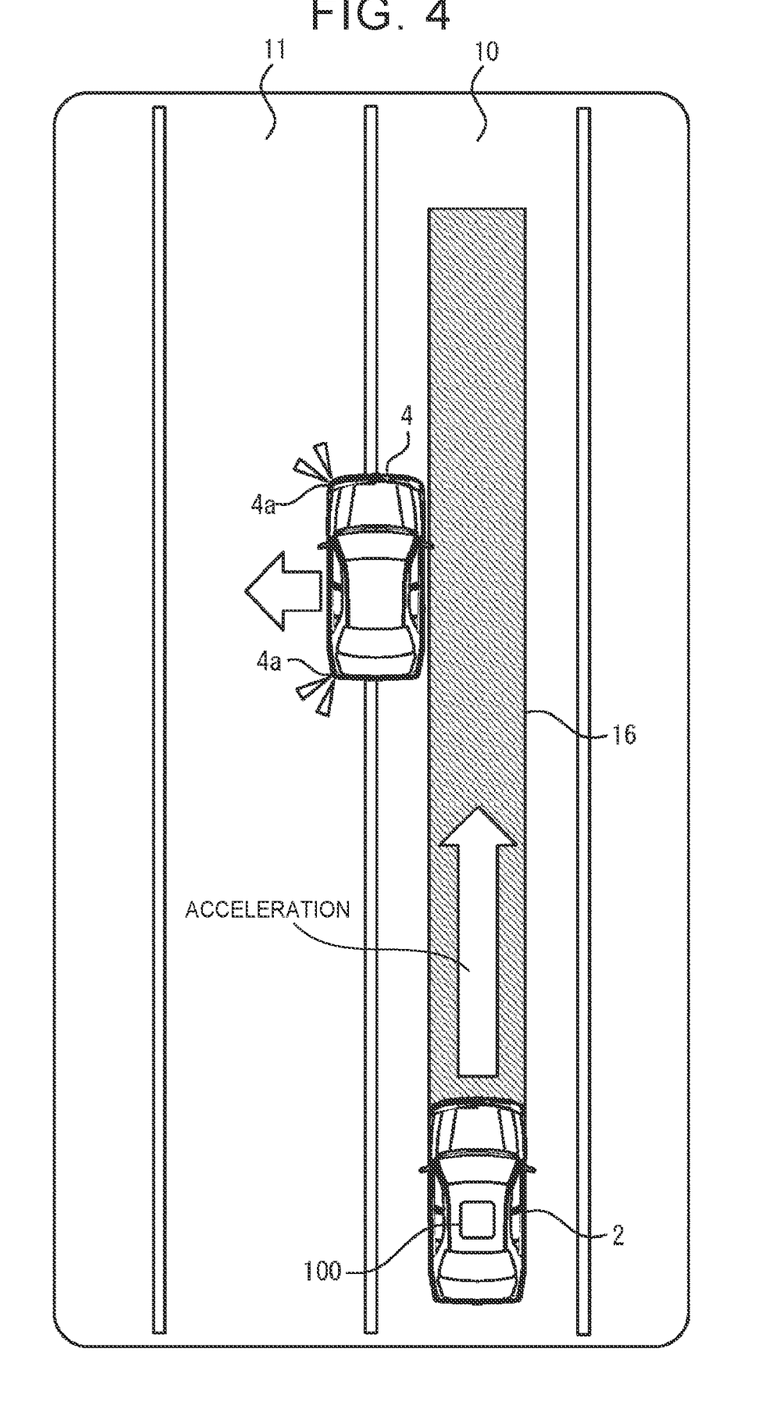
FIG. 4 is another view illustrating the second matter confirmed in the automated driving method according to the embodiment of the present disclosure.

The second matter confirmed in the automated driving method according to the present embodiment will be described using FIGS. 3 and 4. A belt-like region 16 that extends forward from the own vehicle 2 along the lane 10 is depicted in FIG. 3. The region 16 is an occupied region that is to be occupied by the own vehicle 2 in traveling in the lane 10. In other words, the occupied region 16 is a region that will be traced by the own vehicle 2 when the own vehicle 2 continues to travel in the current lane 10. The width of the occupied region 16 is equal to the maximum width of the own vehicle 2. The automated driving system 100 calculates the occupied region 16 extending forward from the own vehicle 2 over a predetermined front distance. The calculated distance of the occupied region 16 is longer than a vehicle-to-vehicle distance set in follow-up traveling control.

While the preceding vehicle 4 travels in the current lane 10, at least part of the preceding vehicle 4 is in the occupied region 16. However, when the preceding vehicle 4 starts making a lane change, the lateral position of the preceding vehicle 4 gradually moves toward the adjacent lane 11. The preceding vehicle 4 then deviates from the occupied region 16 before long, as shown in FIG. 4. The automated driving system 100 senses that the preceding vehicle 4 has deviated from the occupied region 16 toward the adjacent lane 11. That is, the second matter confirmed in the automated driving method according to the present embodiment is that the preceding vehicle 4 has deviated from the occupied region 16 in a direction indicated by the direction indicator lamps 4a.

The first and second matters mentioned above are active conditions for excluding the preceding vehicle 4 from the follow-up target. By combining a confirmation of the first matter and a confirmation of the second matter with each other, it becomes possible to determine clearly whether the lateral movement of the preceding vehicle 4 toward the adjacent lane 11 is intended for a lane change or is merely the wobbling of the preceding vehicle 4. Besides, by regarding deviation of the preceding vehicle 4 from the occupied region 16 as a matter to be confirmed, the own vehicle 2 can be accelerated at the earliest timing that does not cause interference with the preceding vehicle 4.

Next, the third and fourth matters confirmed in the automated driving method according to the present embodiment will be described. The third and fourth matters are passive conditions for excluding the preceding vehicle 4 from the follow-up target.

Figure 5:
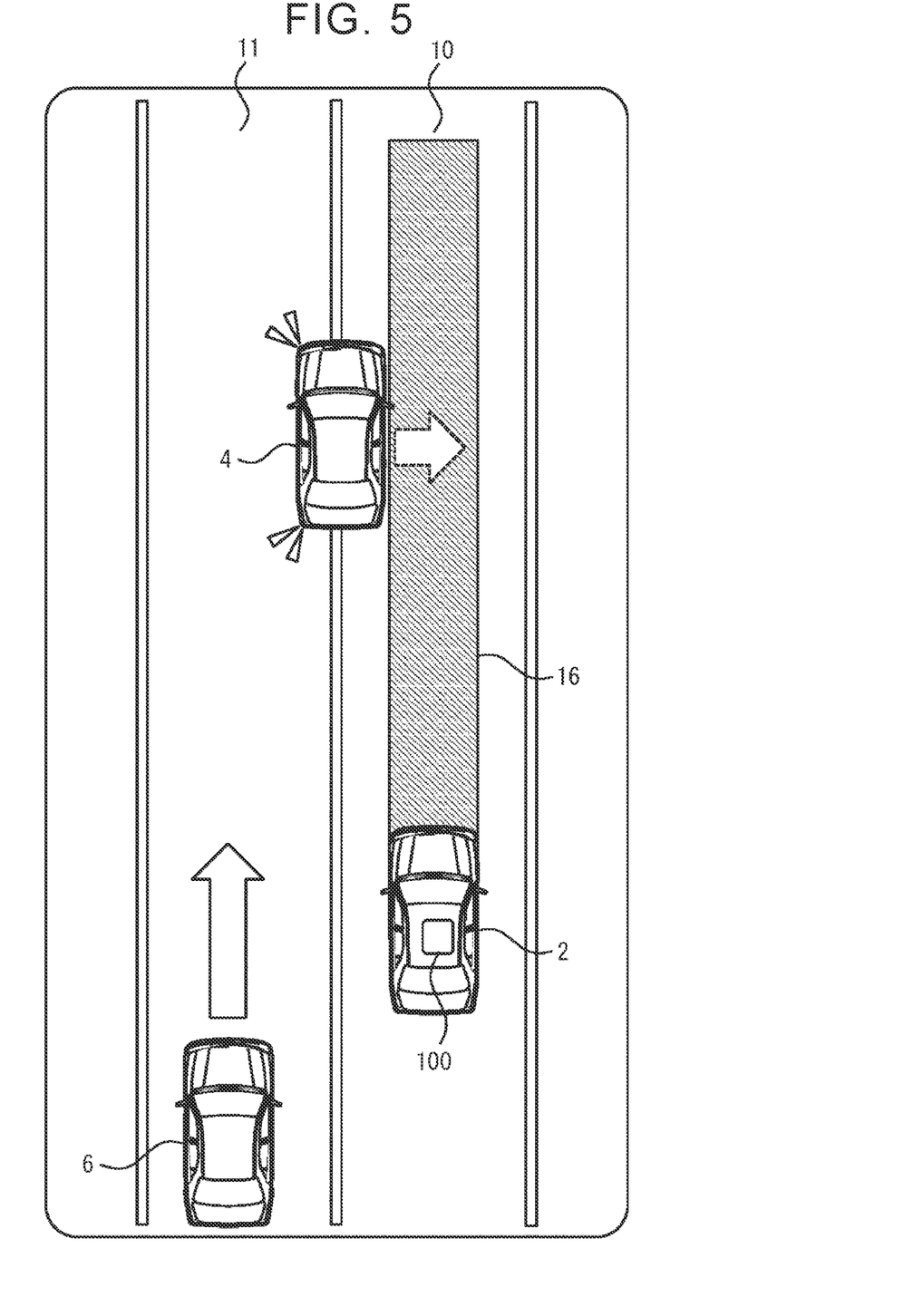
FIG. 5 is a view illustrating a third matter confirmed in the automated driving method according to the embodiment of the present disclosure.

First of all, the third matter confirmed in the automated driving method according to the present embodiment will be described using FIG. 5. The preceding vehicle 4 that has deviated from the occupied region 16 of the own vehicle 2 while blinking the direction indicator lamps, and a high-speed vehicle 6 that approaches the preceding vehicle 4 from behind in the adjacent lane 11 are depicted in FIG. 5. In a scene as depicted in FIG. 5, the driver of the preceding vehicle 4 worries about a contact with the high-speed vehicle 6 traveling behind that could result from the continuation of the lane change. Besides, in the case where the preceding vehicle 4 is an automated driven vehicle that makes a lane change in an automated manner, it may be determined that the lane change should be stopped, based on a relationship with the high-speed vehicle 6 traveling behind. Therefore, in the scene as depicted in FIG. 5, the preceding vehicle 4 that has stopped making the lane change may return to the lane 10.

The automated driving system 100 senses the high-speed vehicle 6 traveling behind the preceding vehicle 4, in response to deviation of the preceding vehicle 4 from the occupied region 16 of the own vehicle 2 with the direction indicator lamps blinking. A determination on the presence of the high-speed vehicle 6 is made based on a speed relative to the own vehicle 2. In concrete terms, it is determined that a vehicle that approaches the preceding vehicle 4 from behind in the adjacent lane 11 at a higher speed than the own vehicle 2 is the high-speed vehicle 6 that makes the preceding vehicle 4 hesitate to make a lane change. That is, the third matter confirmed in the automated driving method according to the present embodiment is that the high-speed vehicle 6 that travels in the adjacent lane 11 at a higher speed than the own vehicle 2 is not sensed behind the preceding vehicle 4.

When the high-speed vehicle 6 is sensed behind the preceding vehicle 4, the automated driving system 100 maintains the preceding vehicle 4 as the follow-up target instead of excluding the preceding vehicle 4 therefrom. Thus, acceleration suppression for follow-up traveling imposed on the own vehicle 2 is maintained without being canceled. Incidentally, the automated driving system 100 adopts a predetermined range with respect to the own vehicle 2, as a sensing range of the high-speed vehicle 6. The sensing range is a range where the presence of the high-speed vehicle 6 can influence a determination by the preceding vehicle 4 as to whether to make a lane change.

Figure 6:
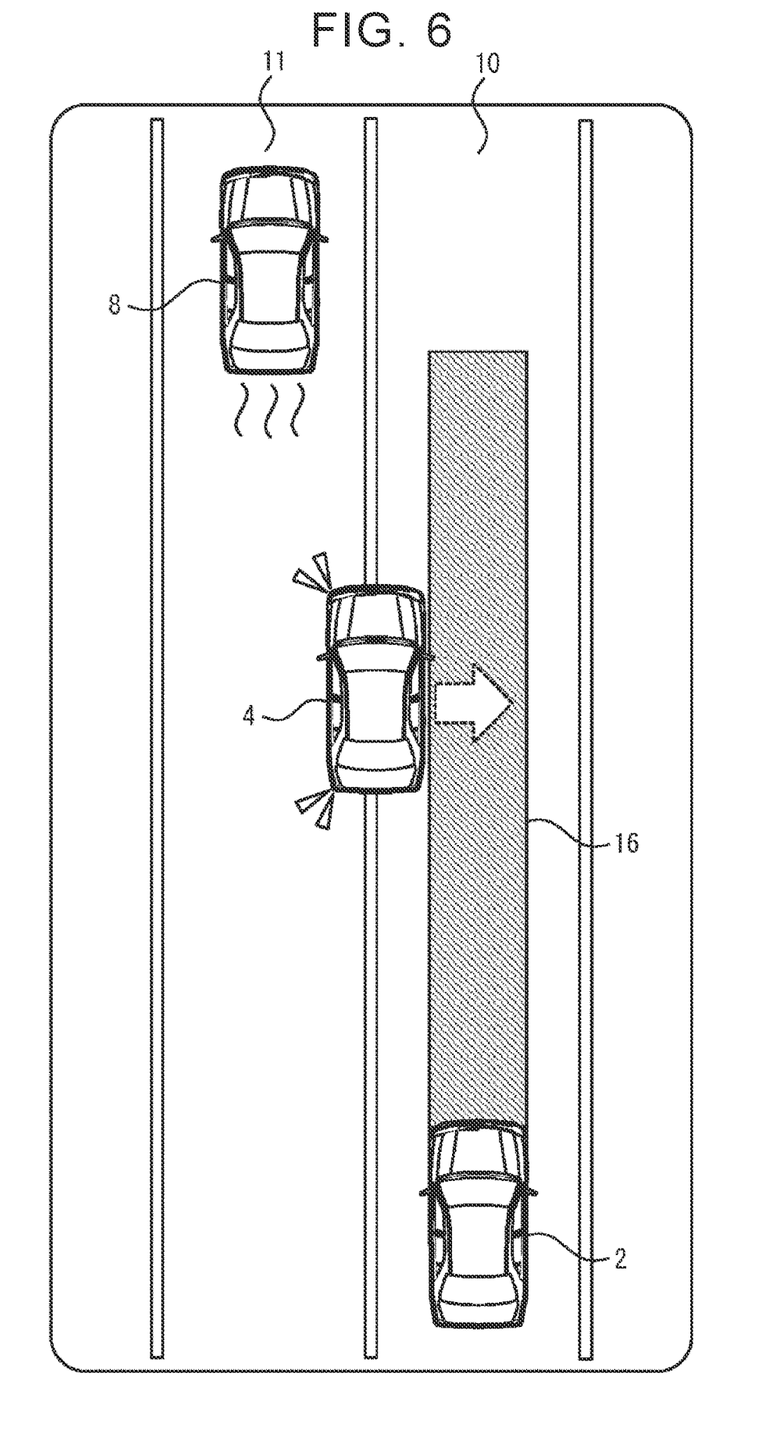
FIG. 6 is a view illustrating a fourth matter confirmed in the automated driving method according to the embodiment of the present disclosure.

Next, the fourth matter confirmed in the automated driving method according to the present embodiment will be described using FIG. 6. The preceding vehicle 4 that has deviated from the occupied region 16 of the own vehicle 2 with the direction indicator lamps blinking, and a low-speed vehicle 8 that travels in the adjacent lane 11 in front of the preceding vehicle 4 are depicted in FIG. 6. In a scene as depicted in FIG. 6, the driver of the preceding vehicle 4 worries about a contact with the low-speed vehicle 8 traveling in front that could result from the continuation of the lane change. Besides, in the case where the preceding vehicle 4 is an automated driven vehicle that makes a lane change in an automated manner, it may be determined that the lane change should be stopped, based on a relationship with the low-speed vehicle 8 traveling in front. Therefore, in the scene as depicted in FIG. 6, the preceding vehicle 4 that has stopped making the lane change may return to the lane 10.

The automated driving system 100 senses the low-speed vehicle 8 traveling in front of the preceding vehicle 4, in response to deviation of the own vehicle 2 from the occupied region 16 with the direction indicator lamps blinking. A determination on the presence of the low-speed vehicle 8 is made based on a speed relative to the preceding vehicle 4. In concrete terms, it is determined that a vehicle traveling in front of the preceding vehicle 4 in the adjacent lane 11 at a lower speed than the preceding vehicle 4 is the low-speed vehicle 8 that makes the preceding vehicle 4 hesitate to make a lane change. That is, the fourth matter confirmed in the automated driving method according to the present embodiment is that the low-speed vehicle 8 traveling in the adjacent lane 11 at a lower speed than the preceding vehicle 4 is not sensed in front of the preceding vehicle 4.

When the low-speed vehicle 8 is sensed in front of the preceding vehicle 4, the automated driving system 100 maintains the preceding vehicle 4 as a follow-up target instead of excluding the preceding vehicle 4 therefrom. Thus, acceleration suppression for follow-up traveling imposed on the own vehicle 2 is maintained without being canceled. Incidentally, the automated driving system 100 adopts a predetermined range with respect to the own vehicle 2 as a sensing range of the low-speed vehicle 8. The sensing range is a range where the presence of the low-speed vehicle 8 can influence a determination made by the preceding vehicle 4 as to whether to make a lane change.

Figure 7:
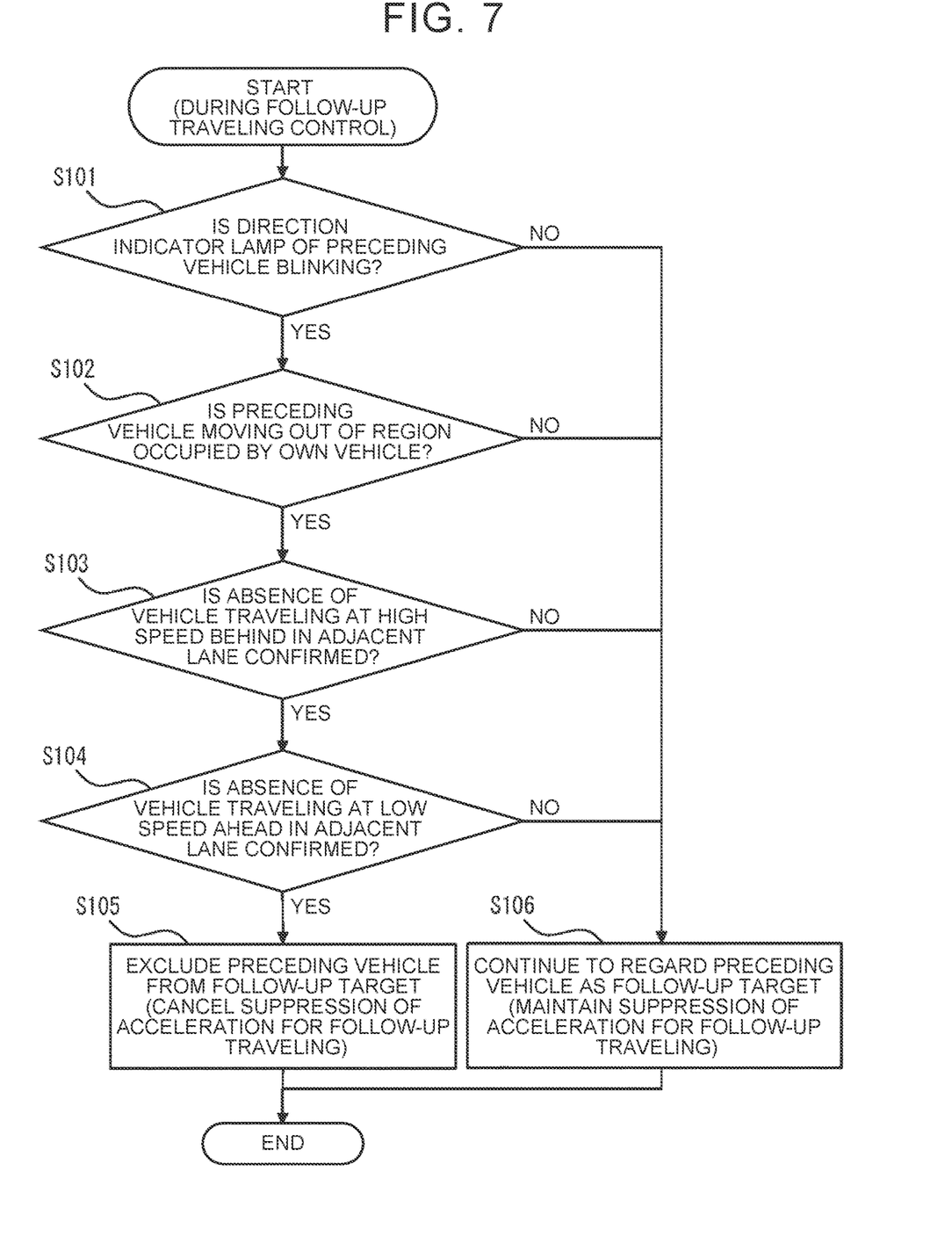
FIG. 7 is a flowchart of the automated driving method according to the embodiment of the present disclosure.

The four matters, namely, the first to fourth matters confirmed sequentially in the automated driving method according to the present embodiment have been described above. When the confirmation of each of the matters is set as a condition determination, the automated driving method according to the embodiment of the present disclosure can be represented by a flowchart as shown in FIG. 7.

Step S101 is a step of condition determination for confirming the first matter. In step S101, it is determined whether or not the preceding vehicle 4 blinks the direction indicator lamps 4a during the performance of follow-up traveling control. If the preceding vehicle 4 blinks the direction indicator lamps 4a, a transition to step S102 is made. If the preceding vehicle 4 does not blink the direction indicator lamps 4a, a transition to step S106 is made, and the preceding vehicle 4 is maintained as the follow-up target in follow-up traveling control. As a result of maintaining the preceding vehicle 4 as the follow-up target, acceleration suppression for follow-up traveling is also maintained.

Step S102 is a step of condition determination for confirming the second matter. In step S102, it is determined whether or not the preceding vehicle 4 has moved out of the occupied region 16 of the own vehicle 2. If the preceding vehicle 4 has moved out of the occupied region 16 of the own vehicle 2, a transition to step S103 is made. If the preceding vehicle 4 has not moved out of the occupied region 16, a transition to step S106 is made, and the preceding vehicle 4 is maintained as the follow-up target, so acceleration suppression for follow-up traveling is maintained.

Step S103 is a step of condition determination for confirming the third matter. In step S103, it is determined whether or not the high-speed vehicle 6 is present behind in the adjacent lane 11. If the high-speed vehicle 6 is not present behind in the adjacent lane 11, a transition to step S104 is made. If the high-speed vehicle 6 is present behind in the adjacent lane 11, a transition to step S106 is made, and the preceding vehicle 4 is maintained as the follow-up target, so acceleration suppression for follow-up traveling is maintained.

Step S104 is a step of condition determination for confirming the fourth matter. In step S104, it is determined whether or not the low-speed vehicle 8 is present ahead in the adjacent lane 11. If the low-speed vehicle 8 is not present ahead in the adjacent lane 11, a transition to step S105 is made. If the low-speed vehicle 8 is present ahead in the adjacent lane 11, a transition to step S106 is made, and the preceding vehicle 4 is maintained as the follow-up target, so acceleration suppression for follow-up traveling is maintained.

In step S105, the preceding vehicle 4 is excluded from the follow-up target in follow-up traveling control. As a result of excluding the preceding vehicle 4 from the follow-up target, acceleration suppression for follow-up traveling is canceled. In the case where the preceding vehicle 4 makes a lane change when the own vehicle 2 travels while following the preceding vehicle 4, acceleration suppression is canceled in response to the fulfillment of such conditions, so the own vehicle 2 can be accelerated at a timing that does not cause a feeling of strangeness to the passenger.

3. Configuration of Automated Driving System

The automated driving system 100 according to the present embodiment is a system for carrying out automated driving at, for example, a level equal to or higher than an automated driving level 2 defined by Society of Automotive Engineers (SAE). The aforementioned automated driving method is realized by the following configuration of the automated driving system 100.

Figure 8:
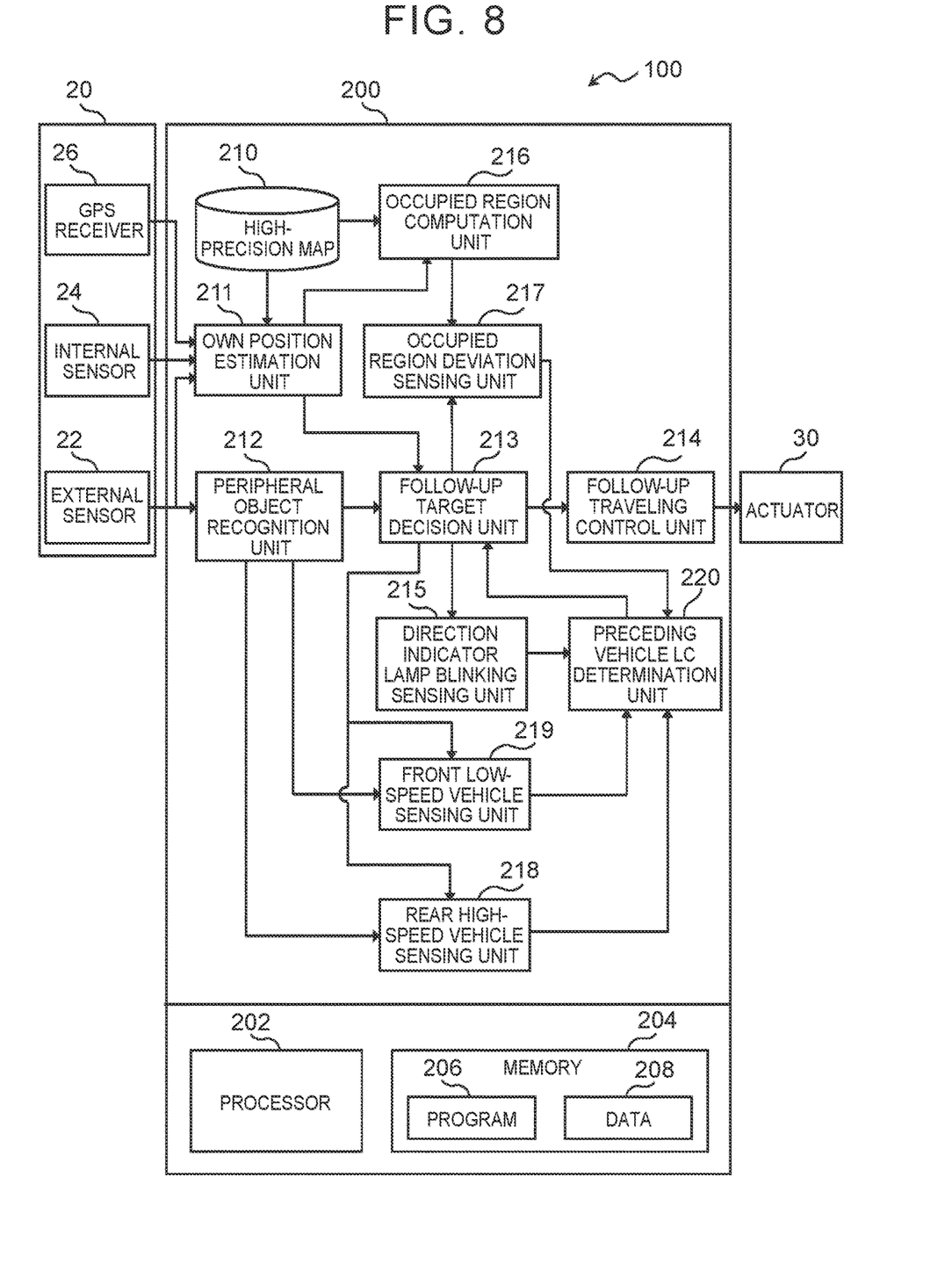
FIG. 8 is a block diagram showing a configuration example of an automated driving system according to the embodiment of the present disclosure.

FIG. 8 is a block diagram showing a configuration example of the automated driving system 100. The automated driving system 100 is equipped with a control apparatus 200, in-vehicle sensors 20 that input information to the control apparatus 200, and actuators 30 that are activated by operation signals output from the control apparatus 200. The in-vehicle sensors 20 and the actuators 30 are connected to the control apparatus 200 through the use of an in-vehicle network such as Controlled Area Network (CAN).

The in-vehicle sensors 20 include external sensors 22, internal sensors 24, and a GPS receiver 26. The external sensors 22 are sensors for acquiring information on a peripheral environment of the own vehicle. The external sensors 22 include a camera, a millimeter-wave radar, and a LiDAR. Processes such as the sensing of objects present around the own vehicle, the measurement of positions of the sensed objects relative to the own vehicle and speeds of the sensed objects relative to the own vehicle, and the recognition of shapes of the sensed objects are performed based on the information obtained from the external sensors 22. The internal sensors 24 are sensors for acquiring information on the movement of the own vehicle. The internal sensors 24 include, for example, wheel speed sensors, an acceleration sensor, a yaw rate sensor, and a steering angle sensor. The GPS receiver 26 measures a current position (e.g., a latitude and a longitude) of the own vehicle, by receiving a signal from a GPS satellite. In addition to these in-vehicle sensors, the automated driving system 100 is also equipped with a communication device that receives information provided by an external server from a wireless communication network.

The actuators 30 include a steering device that steers the vehicle, a driving device that drives the vehicle, and a braking device that brakes the vehicle. The steering device includes, for example, a power steering system, a steer-by-wire steering system, a rear-wheel steering system, and the like. The driving device includes, for example, a BEV system, an FCEV system, a PHEV system, an HEV system, an ICE system, and the like. The braking device includes, for example, a hydraulic brake, an electric power regeneration brake, and the like. Besides, the actuators 30 include devices that are required to be activated in causing the vehicle to travel safely, such as direction indicator lamps and windshield wipers. The actuators 30 are activated by operation signals transmitted from the control apparatus 200.

The control apparatus 200 is an electronic control unit (ECU) having at least one processor 202 and at least one memory 204. The memory 204 includes a main storage device and an auxiliary storage device. At least one program 206 that can be executed by the processor 202, and various data 208 on the program 206 are stored in the memory 204. The program 206 includes an automated driving program for realizing the aforementioned automated driving method. The automated driving program is one example of a storage medium. Various functions are realized in the control apparatus 200 through execution of the automated driving program by the processor 202. Incidentally, the ECU constituting the control apparatus 200 may be an assembly of a plurality of ECU's.

High-precision map information is included in the data 208 stored in the memory 204. The high-precision map information is managed by a high-precision map database 210. The high-precision map information managed by the high-precision map database 210 includes, for example, positional information on roads, information on shapes of the roads, information on branching points at intersections, information on road structures, and the like. The high-precision map database 210 is stored in advance in the auxiliary storage device such as an SSD or an HDD. It should be noted, however, that the high-precision map information may be downloaded from a server via the Internet, or high-precision map information in a server may be referred to.

The control apparatus 200 is equipped with an own position estimation unit 211, a peripheral object recognition unit 212, a follow-up target decision unit 213, a follow-up traveling control unit 214, a direction indicator lamp blinking sensing unit 215, an occupied region computation unit 216, an occupied region deviation sensing unit 217, a rear high-speed vehicle sensing unit 218, a front low-speed vehicle sensing unit 219, and a preceding vehicle LC determination unit 220, as a configuration regarding follow-up traveling control. These units are realized as the functions of the control apparatus 200 when the program 206 stored in the memory 204 is executed by the processor 202.

The own position estimation unit 211 estimates a position of the own vehicle on a map, based on the positional information on the own vehicle received by the GPS receiver 26, information on a traveling state of the own vehicle detected by the internal sensors 24, and the high-precision map information obtained from the high-precision map database 210. The information on the traveling state includes, for example, vehicle speed information, acceleration information, yaw rate information, and the like. Besides, the own position estimation unit 211 can also estimate the position of the own vehicle through the use of positions of characteristic objects detected by the external sensors 22 relative to the own vehicle, the information on the traveling state of the own vehicle detected by the internal sensors 24, and positions of the detected characteristic objects on the map.

The peripheral object recognition unit 212 recognizes objects around the own vehicle by subjecting the information received from the external sensors 22 to a method such as pattern matching or deep learning, and identifies positions and types of the objects. The objects to be recognized by the peripheral object recognition unit 212 include, for example, vehicles, motorcycles, bicycles, pedestrians, and the like. The peripheral object recognition unit 212 outputs the objects with the identified positions and types, as target objects.

The follow-up target decision unit 213 acquires target object information from the peripheral object recognition unit 212, and acquires own position information from the own position estimation unit 211. The follow-up target decision unit 213 decides a follow-up target in follow-up traveling control, based on these pieces of information. More specifically, the follow-up target decision unit 213 decides the preceding vehicle 4 located closest to the own vehicle 2 among preceding vehicles traveling in the same lane 10 as the own vehicle 2, as the follow-up target, as exemplified in FIG. 1.

The follow-up traveling control unit 214 computes an actuator operation amount for causing the own vehicle to travel while following the follow-up target decided by the follow-up target decision unit 213. More specifically, the follow-up traveling control unit 214 computes the actuator operation amount such that a vehicle-to-vehicle distance to the preceding vehicle that is the follow-up target is held equal to an appropriate distance, within such a range as not to exceed a set vehicle speed. An operation signal including the actuator operation amount computed by the follow-up traveling control unit 214 is transmitted from the control apparatus 200 to each of the actuators 30.

The direction indicator lamp blinking sensing unit 215 senses the blinking of the direction indicator lamps of the preceding vehicle regarded as the follow-up target by the follow-up target decision unit 213. The blinking of the direction indicator lamps can be sensed by, for example, subjecting a camera image obtained by photographing the preceding vehicle to image processing. Besides, the direction indicator lamp blinking sensing unit 215 determines whether the right direction indicator lamps or the left direction indicator lamps blink. In the example shown in FIG. 2, it is determined that the left direction indicator lamps 4a blink. A result sensed by the direction indicator lamp blinking sensing unit 215 is input to the preceding vehicle LC determination unit 220.

The occupied region computation unit 216 computes an occupied region that is occupied by the own vehicle in traveling in the current lane. The occupied region is computed through the use of the own position information and the high-precision map information. The occupied region is computed based on the shape of the lane obtained from the high-precision map information and the lateral position of the own vehicle in the lane. The occupied region 16 exemplified in FIG. 3 extends straight forward from the own vehicle 2. However, in the case where the lane is curved, the occupied region is also computed in such as to be curved along the lane. Incidentally, the maximum width of the own vehicle used to compute the occupied region is included in the data 208 stored in advance in the memory 204.

The occupied region deviation sensing unit 217 senses deviation of the preceding vehicle from the occupied region. Deviation of the preceding vehicle from the occupied region can be sensed by comparing the position of the occupied region and the position of the preceding vehicle with each other on the map. In the example shown in FIG. 4, when the right end portion of the preceding vehicle 4 moving leftward leaves the occupied region 16, it is determined that the preceding vehicle 4 has deviated from the occupied region 16. Besides, the occupied region deviation sensing unit 217 determines whether the preceding vehicle has deviated rightward or leftward from the occupied region. A result sensed by the occupied region deviation sensing unit 217 is input to the preceding vehicle LC determination unit 220.

The rear high-speed vehicle sensing unit 218 senses a high-speed vehicle behind the preceding vehicle from among the target objects recognized by the peripheral object recognition unit 212. It is determined whether or not a vehicle traveling in the adjacent lane is a high-speed vehicle to be sensed, based on a positional relationship between the vehicle and the preceding vehicle that is the follow-up target, and a speed of the vehicle relative to the own vehicle. Besides, it is also one of the conditions for determining the vehicle as the high-speed vehicle to be sensed that the vehicle is located within a predetermined sensing range with respect to the own vehicle. In the example shown in FIG. 5, the vehicle 6 behind the preceding vehicle 4 traveling in the adjacent lane 11 travels at a higher speed than the own vehicle 2, so it is determined that the vehicle 6 is a rear high-speed vehicle that makes the preceding vehicle 4 hesitate to make a lane change. A result sensed by the rear high-speed vehicle sensing unit 218 is input to the preceding vehicle LC determination unit 220.

The front low-speed vehicle sensing unit 219 senses a low-speed vehicle in front of the preceding vehicle from among the target objects recognized by the peripheral object recognition unit 212. It is determined whether or not a vehicle traveling in the adjacent lane is a low-speed vehicle to be sensed, based on a positional relationship between the vehicle and the preceding vehicle that is the follow-up target, and a speed of the vehicle relative to the preceding vehicle that is the follow-up target. Besides, it is also one of the conditions for determining the vehicle as the low-speed vehicle to be sensed that the vehicle is located within a predetermined sensing range with respect to the own vehicle. In the example shown in FIG. 6, the vehicle 8 in front of the preceding vehicle 4 traveling in the adjacent lane 11 travels at a lower speed than the preceding vehicle 4, so it is determined that the vehicle is a front low-speed vehicle that makes the preceding vehicle 4 hesitate to make a lane change. A result sensed by the front low-speed vehicle sensing unit 219 is input to the preceding vehicle LC determination unit 220.

The preceding vehicle LC determination unit 220 determines whether or not the preceding vehicle that is the follow-up target will make a lane change (LC), based on respective results sensed by the direction indicator lamp blinking sensing unit 215, the occupied region deviation sensing unit 217, the rear high-speed vehicle sensing unit 218, and the front low-speed vehicle sensing unit 219. This determination is made in accordance with the aforementioned flowchart (see FIG. 7). That is, if neither a rear high-speed vehicle nor a front low-speed vehicle is sensed when the blinking of the direction indicator lamps of the preceding vehicle is sensed and deviation of the preceding vehicle from the occupied region is sensed, it is determined that the preceding vehicle will make a lane change. When it is determined that the preceding vehicle will make a lane change, the preceding vehicle LC determination unit 220 commands the follow-up target decision unit 213 to change the follow-up target.

The follow-up target decision unit 213 excludes the current preceding vehicle from the follow-up target upon receiving a command from the preceding vehicle LC determination unit 220. When there is another preceding vehicle in front of the excluded preceding vehicle, the follow-up target decision unit 213 decides that preceding vehicle as a new follow-up target. In this case, the follow-up traveling control unit 214 computes actuator operation amounts in such a manner as to cause the own vehicle to travel while following the preceding vehicle decided as the new follow-up target, within a range that does not exceed a set speed. On the other hand, when there is no vehicle in front of the excluded preceding vehicle, the follow-up traveling control unit 214 computes the actuator operation amounts in such a manner as to accelerate the own vehicle to the set speed.

4. Other Embodiments

In the automated driving system shown in FIG. 8, the follow-up target is decided based on the position of the own vehicle on the map that has been estimated through the use of the high-precision map information, and the occupied region is computed. However, instead of using the high-precision map information, the follow-up target may be decided based on a positional relationship with marking lines recognized from a camera image, and the occupied region may be computed.

The automated driving method of the present disclosure is applicable to a scene in which the preceding vehicle makes a lane change from a traveling lane to an overtaking lane as well as a scene in which the preceding vehicle makes a lane change from an overtaking lane to a traveling lane. Furthermore, in the case of a road having three or more lanes, the automated driving method of the present disclosure is also applicable to a scene in which the preceding vehicle makes a lane change from a first traveling lane to a second traveling lane adjacent thereto.

In the case where vehicle-to-vehicle communication between the own vehicle and the preceding vehicle is possible, an indication of an intention of making a lane change to an adjacent lane by the preceding vehicle may be acquired through vehicle-to-vehicle communication. For example, in the case where the preceding vehicle is an automated driven vehicle that makes a lane change in an automated manner, the preceding vehicle may transmit information that a flag for starting the lane change has been turned on, to the following vehicle through vehicle-to-vehicle communication. Then, the own vehicle that is the following vehicle may sense an on-signal of the starting flag as the indication of the intention of making the lane change issued by the preceding vehicle.

The determination on the presence of a rear high-speed vehicle may be made with reference to the speed of the preceding vehicle instead of the speed of the own vehicle. That is, when a vehicle traveling in the adjacent lane at a higher speed than the preceding vehicle is sensed behind the preceding vehicle, it may be determined that the vehicle is a rear high-speed vehicle.

The automated driving system of the present disclosure can also be constituted of an in-vehicle computer and a server connected to the in-vehicle computer via a network. In this case, one or some of the functions of the automated driving system of the present disclosure may be assigned to the server.

What is claimed is:

1. An automated driving method comprising:
 during autonomous driving control:
 sensing an indication of an intention of making a lane change to an adjacent lane that is issued from a preceding vehicle that travels in the same lane as an own vehicle, while causing the own vehicle to travel while following the preceding vehicle;
 sensing deviation of the preceding vehicle toward the adjacent lane from an occupied region that is occupied by the own vehicle in traveling in the lane, when the indication of the intention of making the lane change is sensed, the occupied region being computed based on a shape of the lane, map information, and a width of the own vehicle;

excluding the preceding vehicle that makes the lane change from a follow-up target in follow-up traveling control and canceling acceleration suppression for causing the own vehicle to travel while following the preceding vehicle in response to sensing the deviation of the preceding vehicle from the occupied region;

determining whether lateral movement of the preceding vehicle toward the adjacent lane corresponds to the lane change prior to causing the own vehicle to accelerate at a predetermined timing at a predetermined speed; and calculating the occupied region extending forward from the own vehicle over a predetermined front distance, wherein:

a width of the occupied region is equal to a maximum width of the own vehicle, the calculated distance of the occupied region is greater than a vehicle-to-vehicle distance set in the follow-up traveling control, the own vehicle is driven in an automated manner through the follow-up traveling control through adaptive cruise control, and the preceding vehicle is excluded in response to a plurality of matters being sequentially confirmed:

a first matter corresponding to blinking of a direction indicator lamp as the indication of the intention of making the lane change by the preceding vehicle;

a second matter corresponding to the preceding vehicle having deviated from the occupied region in a direction indicated by the direction indicator lamp;

a third matter corresponding to a high-speed vehicle that travels in the adjacent lane at a higher speed than the own vehicle is not sensed behind the preceding vehicle; and    a fourth matter corresponding to a low-speed vehicle traveling in the adjacent lane at a lower speed than the preceding vehicle is not sensed in front of the preceding vehicle.

2. The automated driving method according to claim 1, wherein the acceleration suppression is maintained instead of being canceled, when the high-speed vehicle traveling in the adjacent lane at the higher speed than the own vehicle is sensed behind the preceding vehicle.

3. The automated driving method according to claim 1, wherein the acceleration suppression is maintained instead of being canceled, when the low-speed vehicle traveling in the adjacent lane at the lower speed than the preceding vehicle is sensed in front of the preceding vehicle.

4. An automated driving system comprising:

at least one memory that stores at least one program; and at least one processor coupled to the at least one memory, wherein the at least one processor is configured to, during autonomous driving control:

sense an indication of an intention of making a lane change to an adjacent lane that is issued from a preceding vehicle that travels in the same lane as an own vehicle, while causing the own vehicle to travel while following the preceding vehicle, sense deviation of the preceding vehicle toward the adjacent lane from an occupied region that is occupied by the own vehicle in traveling in the lane, when the indication of the intention of making the lane change is sensed, the occupied region being computed based on a shape of the lane, map information, and a width of the own vehicle, exclude the preceding vehicle that makes the lane change from a follow-up target in follow-up traveling control and cancel acceleration suppression for causing the own vehicle to travel while following the preceding vehicle in response to sensing the deviation of the preceding vehicle from the occupied region is sensed, by executing the at least one program, determine whether lateral movement of the preceding vehicle toward the adjacent lane corresponds to the lane change prior to causing the own vehicle to accelerate at a predetermined timing at a predetermined speed, and calculate the occupied region extending forward from the own vehicle over a predetermined front distance, wherein:

a width of the occupied region is equal to a maximum width of the own vehicle, the calculated distance of the occupied region is greater than a vehicle-to-vehicle distance set in the follow-up traveling control, the own vehicle is driven in an automated manner through the follow-up traveling control through adaptive cruise control, and the preceding vehicle is excluded in response to a plurality of matters being sequentially confirmed:

a first matter corresponding to blinking of a direction indicator lamp as the indication of the intention of making the lane change by the preceding vehicle;

a second matter corresponding to the preceding vehicle having deviated from the occupied region in a direction indicated by the direction indicator lamp;

a third matter corresponding to a high-speed vehicle that travels in the adjacent lane at a higher speed than the own vehicle is not sensed behind the preceding vehicle; and    a fourth matter corresponding to a low-speed vehicle traveling in the adjacent lane at a lower speed than the preceding vehicle is not sensed in front of the preceding vehicle.

5. A non-transitory storage medium storing an automated driving program that is configured to cause a computer to carry out, during autonomous driving control:

sensing of an indication of an intention of making a lane change to an adjacent lane that is issued from a preceding vehicle that travels in the same lane as an own vehicle, while causing the own vehicle to travel while following the preceding vehicle, sensing of deviation of the preceding vehicle toward the adjacent lane from an occupied region that is occupied by the own vehicle in traveling in the lane, when the indication of the intention of making the lane change is sensed, the occupied region being computed based on a shape of the lane, map information, and a width of the own vehicle, excluding the preceding vehicle that makes the lane change from a follow-up target in follow-up traveling control and cancelation of acceleration suppression for causing the own vehicle to travel while following the preceding vehicle in response to sensing the deviation of the preceding vehicle from the occupied region, determining whether lateral movement of the preceding vehicle toward the adjacent lane corresponds to the lane change prior to causing the own vehicle to accelerate at a predetermined timing at a predetermined speed, and calculating the occupied region extending forward from the own vehicle over a predetermined front distance, wherein:
a width of the occupied region is equal to a maximum width of the own vehicle,
the calculated distance of the occupied region is greater than a vehicle-to-vehicle distance set in the follow-up traveling control,
the own vehicle is driven in an automated manner through the follow-up traveling control through adaptive cruise control, and
the preceding vehicle is excluding in response to a plurality of matters being sequentially confirmed:
  a first matter corresponding to blinking of a direction indicator lamp as the indication of the intention of making the lane change by the preceding vehicle;
  a second matter corresponding to the preceding vehicle having deviated from the occupied region in a direction indicated by the direction indicator lamp;
  a third matter corresponding to a high-speed vehicle that travels in the adjacent lane at a higher speed than the own vehicle is not sensed behind the preceding vehicle; and
  a fourth matter corresponding to a low-speed vehicle traveling in the adjacent lane at a lower speed than the preceding vehicle is not sensed in front of the preceding vehicle.

\* \* \* \* \*